US005236535A

United States Patent [19]

Smith

[11] Patent Number: 5,236,535

[45] Date of Patent: Aug. 17, 1993

[54] METHOD FOR THE MANUFACTURE AND PLACEMENT OF PRESSURE-SENSITIVE COMPOSITE COMPONENTS AND ASSOCIATED APPARATUS

[75] Inventor: Daniel E. Smith, Erie, Pa.

[73] Assignee: Syst-A-Matic Tool & Design, Inc., Meadville, Pa.

[21] Appl. No.: 638,221

[22] Filed: Jan. 7, 1991

[51] Int. Cl.[5] .............................................. B32B 31/00

[52] U.S. Cl. .................................... 156/250; 156/257; 156/268; 156/540; 156/542

[58] Field of Search ............... 156/257, 268, 540, 541, 156/542, 250

[56] References Cited

U.S. PATENT DOCUMENTS

| | | | |
|---|---|---|---|
| 4,359,358 | 11/1982 | Hattemer | 156/268 |
| 4,469,550 | 9/1984 | O'Steen, Jr. | 156/540 |
| 4,479,839 | 10/1984 | Tasma | 156/542 |
| 4,612,079 | 9/1986 | Ostrow | 156/540 |
| 4,680,081 | 7/1987 | Hamisch, Jr. | 156/540 |
| 4,726,865 | 2/1988 | Treat | 156/542 |
| 4,849,043 | 7/1989 | Instance | 156/268 |

*Primary Examiner*—David A. Simmons
*Assistant Examiner*—James J. Engel, Jr.
*Attorney, Agent, or Firm*—Reed Smith Shaw & McClay

[57] ABSTRACT

This invention provides an improved method and apparatus for the manufacture of pressure-sensitive labels or pressure-sensitive composite material components and placement thereof. The invention provides a flexible, high-speed method of accurately severing a specific component from a continuous length of pressure-sensitive label stock or composite material stock and placing the severed component at a precise location on the surface of a product. Accurately positioning a severed component of a pressure-sensitive composite material on a desired surface is achieved by imparting a precise longitudinal forward movement to the feedstock containing the severed component immediately after the component has been severed in a manner that prevents lateral movement of the carrier strip. The severed component is brought into contact with a transport means and rigidly attached to the transport means at a precise location thereon prior to separating any portion of the severed component from the carrier strip. The severed component is then separated from the carrier strip and transported to a precise position with respect to the surface to which it is to be applied. A substantially constant tension is maintained on the carrier strip during the process.

14 Claims, 6 Drawing Sheets

METHOD FOR THE MANUFACTURE AND PLACEMENT OF PRESSURE-SENSITIVE COMPOSITE COMPONENTS AND ASSOCIATED APPARATUS

FIELD OF INVENTION

This invention relates to an improved method for the manufacture and placement of pressure-sensitive labels or pressure-sensitive composite material components and an apparatus related thereto. More specifically, the invention relates to a flexible, high-speed method of accurately severing a specific component from a continuous length of pressure-sensitive label stock or composite material stock and placing the severed component at a precise location on the surface of a product.

BACKGROUND OF THE INVENTION

Accurately sizing and precisely locating pressure-sensitive components, such as unprinted or printed labels, conductive components, insulating components, and other similar items, on the surface of a product to which they are to be adhered requires that the component (a) be manufactured to predefined dimensional tolerances, (b) contain a layer of material that adheres the item to the desired surface upon contact, (c) be precisely positioned relative to a transport means, (d) be rigidly attached to the transport means in a precisely defined location, (e) be transported to the desired location on the product surface, and (f) be applied thereto. Of these five requirements, the two that are most difficult to achieve are precise placement and attachment relative to the transport means.

Using labels as an example, one known method for accurately locating and attaching a label to a transport means generally involves stacking individual pre-cut labels into a magazine-type feeding mechanism that precisely positions the labels with reference to the transport means, contacting either the top or bottom label in the stack with the transport means and attaching the label thereto, and transporting the label to the surface to which it is to be applied. The labels placed in the magazine may consist of a single material, such as paper or plastic, to which a layer of adherent material, such as glue or adhesive, must be applied after the label is removed from the magazine and before the label is adhered to the surface, as described in U.S. Pat. No. 4,289,562. Alternatively, the labels may be a composite consisting of a layer of label material and at least one layer of non-adherent material, such as glue or other adhesive, capable of being activated to an adherent state after the label is removed from the stack and before the label is adhered to the desired surface, as described in U.S. Pat. Nos. 3,232,804, 3,232,815, and 3,904,466. Typically, magazine-type feeding devices cannot be used to feed pressure-sensitive labels which contain a pre-activated layer of adherent material that would cause each label in the magazine to adhere to the adjacent label and prevent rapid removal of a single label from the magazine.

Another known and generally used method of accurately locating and attaching a label to a transport means involves partially severing a label from a continuous length of label material, transporting the partially severed label to a precise position relative to the transport means by imparting motion to the unsevered web of the continuous length, attaching the partially severed label rigidly to the transport means, such as by the application of a vacuum, and severing the label completely from the unsevered web by causing the transport means to move relative to the unsevered web. This method is applicable to labels consisting of a single layer to which an adherent layer must subsequently be applied, as described in U.S. Pat. Nos. 4,108,710 and 4,632,721, as well as to labels containing at least one layer of material in the non-adherent state that is capable of being subsequently activated to an adherent state prior to application of the label. This method, as described, cannot be employed for pressure-sensitive label stock containing an exposed adherent layer, since such stock would adhere to any surface of the label application equipment with which it may come into contact thereby preventing unfettered movement of the stock through the equipment.

Precisely locating components containing an adherent layer has long been a problem in packaging, electronics, and general manufacturing operations because of the tendency of the adherent layer to instantly bond to any surface with which it comes into contact. To prevent such adhesion, pressure-sensitive components are normally releasably secured to a continuous carrier strip that prevents the adherent layer of the component from adhering to the surfaces of the equipment in which it is being processed and may also be used transport the component. The carrier strip must be removed prior to adhering the pressure-sensitive component to the surface of the product for which it is intended.

The feedstock employed in most commonly used pressure-sensitive label application equipment generally consists of coils of pre-cut pressure-sensitive labels releasably secured to a continuous carrier strip which maintains the relative position of the pre-cut labels and is additionally used to transport the labels through the label application equipment.

Typically, coils of pre-cut circumferentially severed labels, commonly known as window labels, are prepared by (a) slitting a master coil consisting of a continuous length of pressure-sensitive label stock releasably secured to a continuous length of carrier strip material into multiple narrow strips having a lateral dimension greater than that of the label to be severed therefrom, (b) transporting each narrow strip directly into an integral severing means without intermediate processing, (c) circumferentially severing the pressure-sensitive label stock as the narrow strip longitudinally traverses the severing means such that the carrier strip remains unsevered, and (d) coiling each narrow strip as it exits the severing means.

Because most standard label application equipment guides the carrier stock by remaining in constant contact with one of its longitudinal edges, any uncontrolled variation in the lateral position of a pre-cut pressure-sensitive label relative to the longitudinal edge misaligns the label with respect to the transport means and prevents precise attachment thereto. It is commonly known that uncontrolled variations of from 0.015" to 0.030" in the lateral position of the label on the carrier strip can occur as a result of uncontrolled lateral movement of the aforesaid individual narrow strips upon exiting the slitter and prior to entering the severing means in the label manufacturing process heretofore described. In addition, inconsistencies may also occur in the longitudinal positioning of a pre-cut label relative to the carrier strip due to creep which can take place in the adherent layer of the labels during coiling and storage in the coiled condition. If the adherent layer is of uniform thickness and physical characteristics, the creep normally results in a uniform longitudinal movement relative to the carrier strip. If the adherent layer is non-uniform in thickness or physical characteristics, the relative movement between a pre-cut label and the carrier strip may result in the label being skewed relative to the carrier strip. In either event, the longitudinal variation of the label position relative to the carrier strip precludes precise alignment with the transport means. Standard methods used to locate a circumferentially severed label relative to the transport means, including guiding and transporting the carrier strip by means of accurately located holes along the longitudinal edges of the strip or the use of optical or mechanical means that sense the leading or trailing edge of each label, are generally inadequate to compensate for the aforesaid problems in alignment of the label relative to the transport means.

All of the difficulties enumerated above are compounded when attempting to accurately print a pattern on pre-cut labels, especially when repetitive printing steps are required, as in multi-color printing.

The conventional methods of presenting a pre-cut label to the transport means of label application equipment further compound the problem of precisely locating a label relative to the transport means and, therefore, accurately locating the label on the product surface. Typically, the continuous carrier strip to which pre-cut labels are releasably adhered is passed over a knife edge which alters the direction of movement of the carrier strip such that the label is caused to completely or partially separate from the carrier strip prior to becoming attached to the transport means which may be a vacuum pick-up head attached to either a rotary device or an oscillating pick-and-place device. Upon separating from the label, the carrier stock is subsequently coiled on a driven take-up device.

In one commercially available label application machine, the Cosmos 1 Model 612 produced by Ohio Electronics Machinery, the carrier strip is completely separated from the pre-cut or severed label by reversing the direction of the carrier strip as it moves over a knife edge. The unrestrained label is supported relative to the transport means and directed towards the transport means by a stream of pressurized air directed upwards at the adherent surface of the label. The label is then firmly attached to the transport means by means of a vacuum applied to the transport means. This process fails to provide a means for positively and accurately controlling the location of the label between the moment it separates from the carrier strip and the moment that it attaches to the transport means, thus further exacerbating the difficulty in achieving precise alignment.

One method of partially maintaining positive control of a severed label upon separation from a continuous carrier strip is described in U.S. Pat. No. 3,243,331. In this method, which is used primarily to wrap flag labels circumferentially around small cylindrical products, the leading edge of an adhesive-coated label is peeled from the carrier strip by means of prehensile clamping jaws which clamp onto a minor exposed portion of the label. The clamping jaws peel the label from the carrier strip, transport the label over the surface of the product to which it is to be adhered, and move down to adhere the label to the surface. Although this method assures that a small portion of the label is positively located and restrained during separation from the carrier material and during transport, it does not provide for rigid support of the entire label or even a major portion of the label during separation and transport. Therefore, this method does not assure accurate placement of the label. Further, this method does not provide a means for preventing adherence of the label to the jaws.

U.S. Pat. No. 4,188,251 discloses a low speed method of manually applying a two-part, pre-cut label in which only partial positive control of the label is maintained prior to adhering the label to the desired surface. The two-part label employed in this method consists of a first part that is releasably adhered to a continuous carrier strip and a second part that is devoid of an adherent layer and partially severed from the first part and partially severed to a greater extent from the second part of the adjacent label. In this method, the carrier strip is removed from all but a small portion of the adherent surface of the first label part by drawing the carrier strip around a relatively sharp bend until the label is advanced to a position at which only a trailing marginal end portion remains adhered to the carrier strip. The label is next rigidly adhered to the surface of the product prior to being separated from the carrier strip and finally severed from the adjacent label. Obviously, this method of placing labels on a product surface from a hand-held device does not provide positive control of label placement and cannot be used for the automated manufacture of fully severed labels and the accurate application of the labels to the surface of products at high speeds.

A method of separating a pre-cut label from a continuous carrier strip and applying the label to the moving surface of a product is described in U.S. Pat. No. 4,080,239. In this method, a continuous carrier strip is partially separated from a pre-cut label releasably adhered thereto by changing the direction of motion of the carrier strip by 90°, guiding the partially separated label through rollers which propel the label forward causing it to separate from the carrier strip and maintain contact with a spring-loaded arm which forces the leading edge of the label into contact with the moving surface and causes the label to become progressively attached thereto. This method is not generally applicable to adhering labels to a stationary surface, does not provide means to compensate for relative motion between the label and the carrier strip during coiling and storage, and does not prevent contact between the adherent layer of the label and the surfaces of the label application equipment.

None of these prior art label application methods are adapted to the accurate production and placement of pressure-sensitive labels. There remains therefore a need for a practical method of sequentially producing a high quality unprinted or printed label from a continuous length of label stock, precisely locating the label relative to a transport means without contact between the adherent layer of the label and any component of the label application equipment, and accurately applying the label to the surface of a stationary product. A process incorporating these improvements would substantially reduce the cost of applying labels to a product, improve the quality of the applied label, and improve the appearance of the product containing the label.

SUMMARY OF THE INVENTION

The present invention has met the heretofore described needs. Generally, the present invention provides a method for accurately severing a component from a precisely defined location along a continuous length of pressure-sensitive composite material, directly transporting the severed component to a product to which it is to be applied, and adhering the severed component to the product at a precisely defined location on the product surface.

The present invention, more specifically, provides an integrated continuous method of manufacturing a pressure-sensitive composite component, which may contain a pattern imparted in a single operation or in multiple sequential operations, and adhering the composite component to a desired location on the surface of a product which preferably includes the steps of: a) severing from a defined location along the continuous length of pressure-sensitive composite material a component without severing the carrier strip to which the pressure-sensitive composite material is releasably adhered; b) transporting the feedstock such that the severed component is transported to a defined location with respect to a transport means; c) rigidly attaching the severed component to the transport means at a defined location thereon; d) subsequent to attaching the severed component to the transport means, separating the carrier strip from the severed component; e) transporting the severed component to a desired position with respect to a surface to which the severed component is to be applied; and f) adhering the severed component to the product surface.

Severing of the component from the pressure-sensitive composite material is preferably achieved by accurately locating the component to be severed beneath a cutting means that severs the component without severing the continuous length of carrier strip to which it is releasably adhered and without altering the location of the label on the carrier strip. Accurately positioning the severed component on the product surface is preferably achieved by: a) imparting a predetermined longitudinal forward movement to the carrier strip containing the severed component immediately after the component has been severed in a manner that prevents lateral movement of the carrier strip; b) bringing the severed component into contact with a transport means and rigidly attaching the component to the transport means at a precise location thereon prior to separating any portion of the severed component from the carrier strip; c) separating the carrier strip from the severed component; and d) transporting the severed component to a precise position with respect to the product surface to which it is to be applied.

The method preferably incorporates a means of maintaining a constant tension on the carrier strip to maintain control of the position of the severed component throughout the process.

The present invention also provides an apparatus for the manufacture of a component of a continuous length of pressure-sensitive composite material releasably adhered to a continuous length of carrier strip and placement thereof, comprising: a) a stationary member; b) a means for imparting a predetermined longitudinally forward movement in relation to the stationary member to the feedstock; c) a severing means positioned such that the predetermined longitudinally forward movement of the feedstock is capable of positioning a predetermined component of the pressure-sensitive composite material at a defined position relative to the severing means; and d) a transport means positioned such that the predetermined longitudinally forward movement of the feedstock is capable of positioning a severed component of the pressure-sensitive composite material at a defined position relative to the transport means.

It is thus an object of the present invention to provide a method and apparatus for accurately severing a component at a precise location along a continuous length of pressure-sensitive composite material and to directly transport the component to a precise location on the surface of a product to which it is to be adhered without intermediate storage.

It is a further object of this invention to provide a method for accurately severing a component from a continuous length of pressure-sensitive composite material without severing the continuous carrier strip to which it is releasably adhered.

It is a further object of this invention to accurately position a component severed from a continuous length of pressure-sensitive composite material relative to a transport means and rigidly attach the component thereto prior to the separation of the component from a carrier strip to which it is releasably adhered.

It is a further object of this invention to provide a method for simultaneously imparting a repetitive pattern to a continuous length of pressure-sensitive composite material and accurately severing a previously imparted pattern from the length of composite material without intermediate storage.

It is a further object of this invention to provide a high speed, automated, method of accurately applying adhesive-backed labels and other adhesive-backed products to the surface of the products for which they are intended.

It is a further object of this invention to provide labels and labelled products of improved quality and consistency.

It is a further object of this invention to provide a means for maintaining a constant tension on at least one layer of a continuous length of material consisting of two or more layers that is subject to intermittent reciprocating motion and reversal of direction.

These and other objects of the invention will be more fully understood from the following detailed description of the invention and reference to the illustrations appended hereto.

DESCRIPTION OF PREFERRED EMBODIMENTS

As employed herein, the terms "pressure-sensitive composite component" and "pressure-sensitive composite material" will refer to (a) a pressure-sensitive label or other pressure-sensitive component consisting of at least two layers and containing at least one external layer of adherent material that can be rigidly adhered to the surface of a product by the application of pressure and (b) the composite material from which the component is produced, respectively.

As employed herein, the expression "carrier strip" will refer to a continuous length of material used to transport a continuous length of pressure-sensitive composite material or pressure-sensitive composite components severed therefrom to which an adherent layer of the pressure-sensitive composite material or the severed component is releasably adhered.

Figure 1:
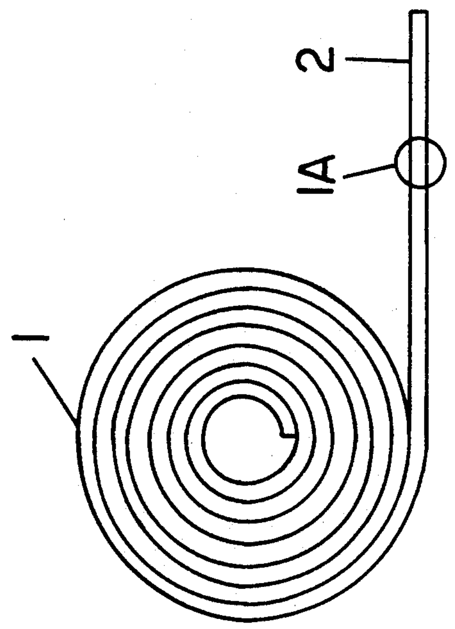
FIG. 1 is a side view of a coil of a two-layer pressure-sensitive composite.

FIGS. 1 and 1A and 2 and 2A illustrate two of the many types of pressure-sensitive composite materials that may be utilized in the method of this invention. FIG. 1 illustrates a coil 1 consisting of a pressure-sensitive composite material 2 containing a continuous length of non-adherent first layer 3 and a second adherent layer 4 that is releasably adhered to a carrier strip 5. First layer 3 may be paper, plastic, metal, fabric, fiberglass, or any other material suited to the intended purpose for which the material is to be adhered to a surface. Second layer 4 may be an activated glue or adhesive or any other adherent material suited to rigidly adhering first layer 3 to the surface. The carrier strip 5 may be made from paper or plastic or any other material suited to transporting composite material 2 and being releasably adhered thereto. Carrier strip 5 may contain a release agent 6 on the surface adjacent to adherent layer 5.

Figure 2:
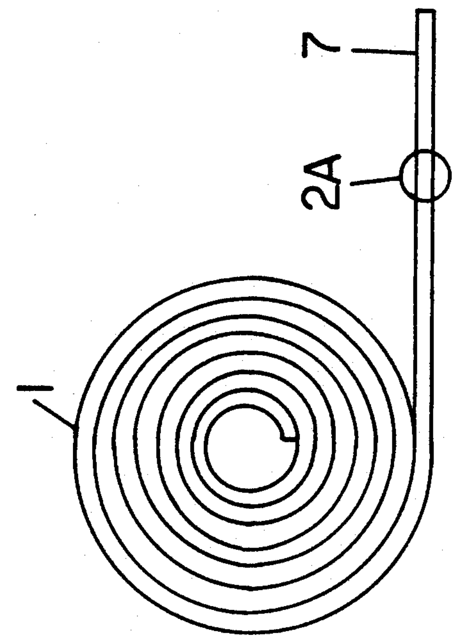
FIG. 2 is a side view of a coil of a multi-layer pressure-sensitive composite.
Figure 2A:
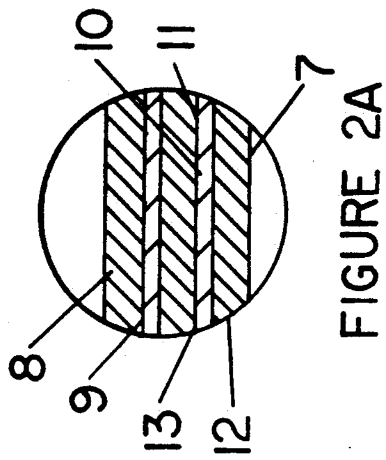
FIG. 2A is an enlarged detail of the corresponding portion of FIG. 2.
Figure 1A:
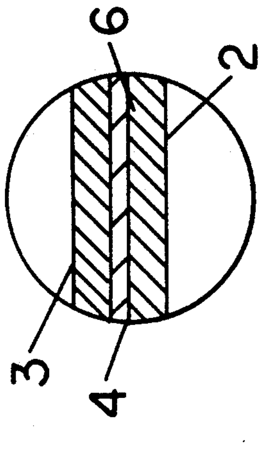
FIG. 1A is an enlarged detail of the corresponding portion of FIG. 1.

FIGS. 2 and 2A illustrates a multi-layer pressure-sensitive composite 7 containing a first non-adherent layer 8 consisting of any one of the materials heretofore mentioned with respect to non-adherent first layer 3 (FIG. 1A), a second layer 9 of glue or other adherent material capable of bonding first layer 8 to a third layer 10 which may also consist of any one of the materials heretofore mentioned with respect to the layer 3, and a fourth layer 11 of adherent pressure-sensitive material which may consist of any of the materials mentioned heretofore with respect to adherent layer 4 (FIG. 1A). Multilayer composite 7 is releasably adhered to carrier strip 12 which may consist of any one of the materials mentioned heretofore with respect to carrier strip 5 (FIG. 1A) and may contain a release agent 13 on the surface adjacent to adherent fourth layer 11.

FIGS. 3, 3A, 4 and 5 illustrate in greater detail various aspects of accurately manufacturing a patterned or unpatterned pressure-sensitive composite component and applying it to a product surface.

Figure 3:
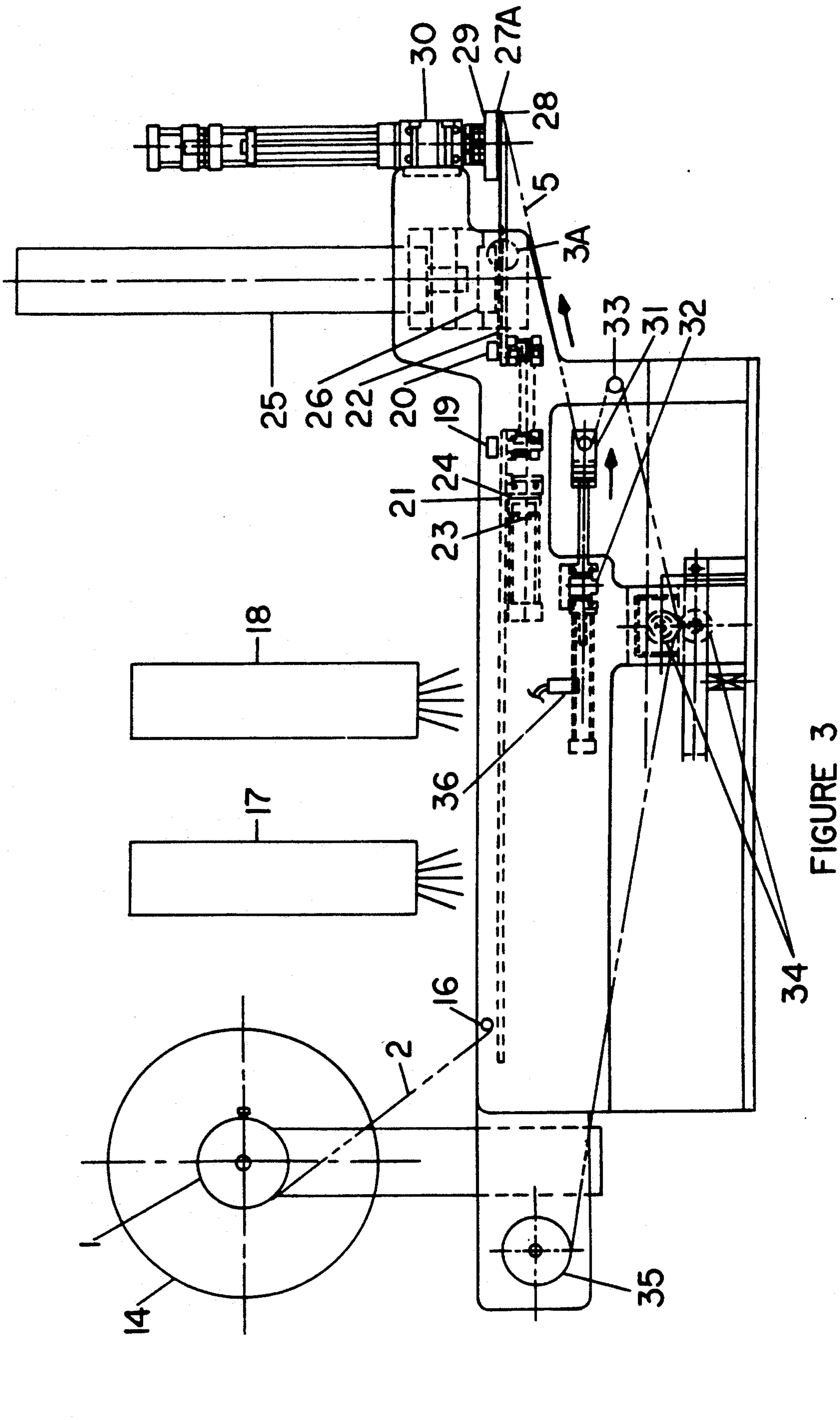
FIG. 3 is a schematic illustration of the apparatus at the end of the forward movement of the stripper plate.
Figure 3A:
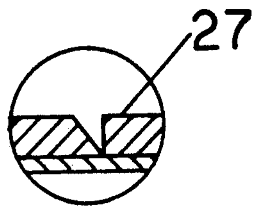
FIG. 3A is an enlarged detail of the corresponding portion of FIG. 3.

Referring to first to FIGS. 3 and 3A, and using as an example a two-layer composite material similar to that illustrated in FIG. 1, the feedstock 2 from which the pressure-sensitive composite component is produced consists of a continuous length of a non-adherent first layer 3 and an adherent second layer 4 releasably adhered to a continuous length of carrier strip 5. It is preferred that the feedstock 2 be in the form of a coil 1 mounted on a dispensing reel 14 of a label manufacturing and application device 15. Feedstock 2 sequentially traverses a guide roller 16, a first pattern imparting means 17, a second pattern imparting means 18 precisely positioned and aligned with respect to the first pattern imparting means 17, and a set of escapement bars 19 and 20. Fixed escapement bar 19 is rigidly attached to stationary member 21 of label manufacturing and application device 15. Movable escapement bar 20 is rigidly mounted on a movable stripper plate 22 which is attached to the actuating shaft of a slide assembly 24. Stripper plate 22 periodically imparts a precise longitudinally forward movement to feedstock 2 causing it to traverse the label manufacturing and application device 15 as will be hereinafter described. The longitudinally forward movement of slide assembly 24 may be accurately and adjustably controlled by clamp collars 23. The forward movement of slide assembly 24 determines the exact distance traversed by feedstock 2 and the longitudinal position of feedstock 2 with respect to pattern imparting means 17 and 18, a severing means 25, and a transport means 30.

Figure 8:
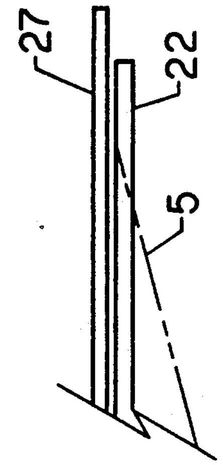
FIG. 8 is an illustration of a side view of the stripper plate in its extended position.

Feedstock 2 next traverses severing means 25 which is preferably precisely positioned and aligned with respect to pattern imparting means 17 and 18. Severing means 25 contains a circumferential severing member 26 (shown in FIG. 6) which severs a pressure-sensitive composite component 27 from feedstock 2 without severing carrier strip 5 to which it is releasably adhered. The feedstock 2 next is aligned with transport means 30 such that a previously severed composite component 27A is precisely align therewith. Upon separation from severed component 27A, carrier strip 5 traverses a slot 28 (shown in FIG. 7) in the distal edge of stripper plate 22 such that the direction of movement of the carrier strip is altered by greater than 90° as seen best in FIG. 8. The precision-machined slot 28 prohibits lateral movement of carrier strip 5 thereby assuring precise lateral positioning of the composite material strip and composite component 27 throughout the process.

Carrier strip 5 next traverses tension roll 31 which is attached to tensioning means 32 which maintains a constant tension on carrier strip 5 throughout the process, including the periods of forward motion of stripper plate 22, periods during which stripper plate 22 is stationary and feedstock 2 is acted upon by pattern imparting means 17 and 18, severing means 25, and transport means 30, and periods during which stripper plate 22 is retracted from alignment with transport means 30 and carrier strip 5 is separated from composite component 27A. The tension means preferably is an air spring in which a constant air pressure is maintained on a piston to provide a constant force on the piston irrelevant of the piston position. After separation from the severed composite component 27A, carrier strip 5 traverses tension roll 31, idler roll 33, and is gripped by drive rolls 34 which are actuated by a drive roll motor (not shown). As will be hereinafter described in detail, drive rolls 34 impart motion to carrier strip 5 such that the carrier strip 5 traverses drive rolls 34 and the length of the carrier strip 5 traversing the drive rolls is subsequently coiled on independently driven take-up reel 35. Severing means 25 and transport means 30 are preferably spaced apart by a distance equal to the space between pattern imparting means 17 and 18 or a multiple thereof.

With continued reference to FIGS. 3 and 3A, during operation, feedstock 2 is precisely positioned with respect to (a) first pattern imparting means 17 which imparts a first pattern portion to the non-adherent surface of the feedstock, (b) second pattern imparting means 18 which imparts a second pattern portion coincident with a previously imparted first pattern portion, (c) severing means 25 which circumferentially severs a pressure-sensitive component 27 from a component of the feedstock containing a previously imparted pattern consisting of a first pattern portion and a coincident second pattern portion without severing carrier strip 5, and (d) transport means 30 which has been brought into contact with a previously severed pressure-sensitive composite component 27A and rigidly attached thereto. Upon attaining this position, feedstock 2 is rigidly clamped to fixed member 21 by activating fixed escapement bar 19 and movable escapement bar 20 is unclamped.

Figure 4:
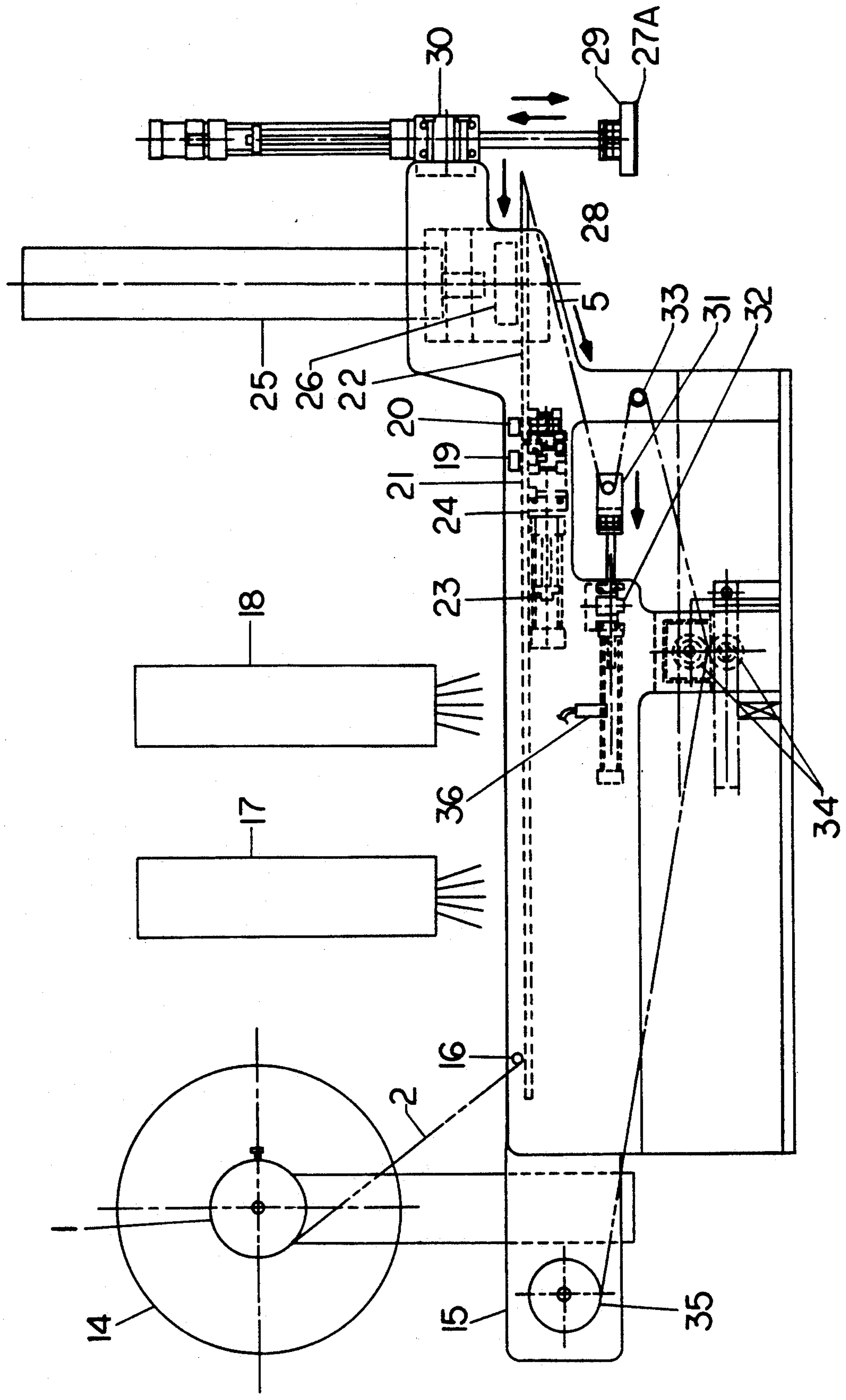
FIG. 4 is a schematic illustration of the apparatus at the end of the retraction of the stripper plate.

With reference to FIG. 4, upon completion of the simultaneous process steps of imparting a first pattern portion, imparting a second pattern portion coincident with a previously imparted first pattern portion, severing a component containing a previously imparted two-portion pattern, and rigidly attaching a previously severed pressure-sensitive component to attachment head 29 of transport means 30, stripper plate 22 is retracted longitudinally backwards with respect to transport means 30. Coincident with the retraction of stripper plate 22, tensioning means 32 causes tension roll 31 to retract in a longitudinally backwards direction such that a substantially constant degree of tension is maintained in carrier strip 5. The retraction of tension roll 31 causes carrier strip 5 to be drawn over the edge of slot 28 in the distal edge of stripper plate 22 and become separated from pressure-sensitive composite component 27A which is rigidly attached to transport means 30. By maintaining a substantially constant tension in the carrier strip 5, tension roll 31 keeps the carrier strip 5 in intimate contact with the edge of the stripper plate 22 so that the carrier strip 5 is smoothly separated from the tightly-held severed component 27A, and prevents any slack in the carrier strip 5 resulting from the carrier strip 5 moving over the edge of the slot 28 in stripper plate 22. Upon separation of carrier strip 5 from severed composite component 27A, transport means 30 transports severed component 27A to the surface to which it is to be adhered, precisely applies the composite component 27A rigidly thereto, detaches the component from attachment head 29 and, subsequently, returns to its original position.

Figure 5:
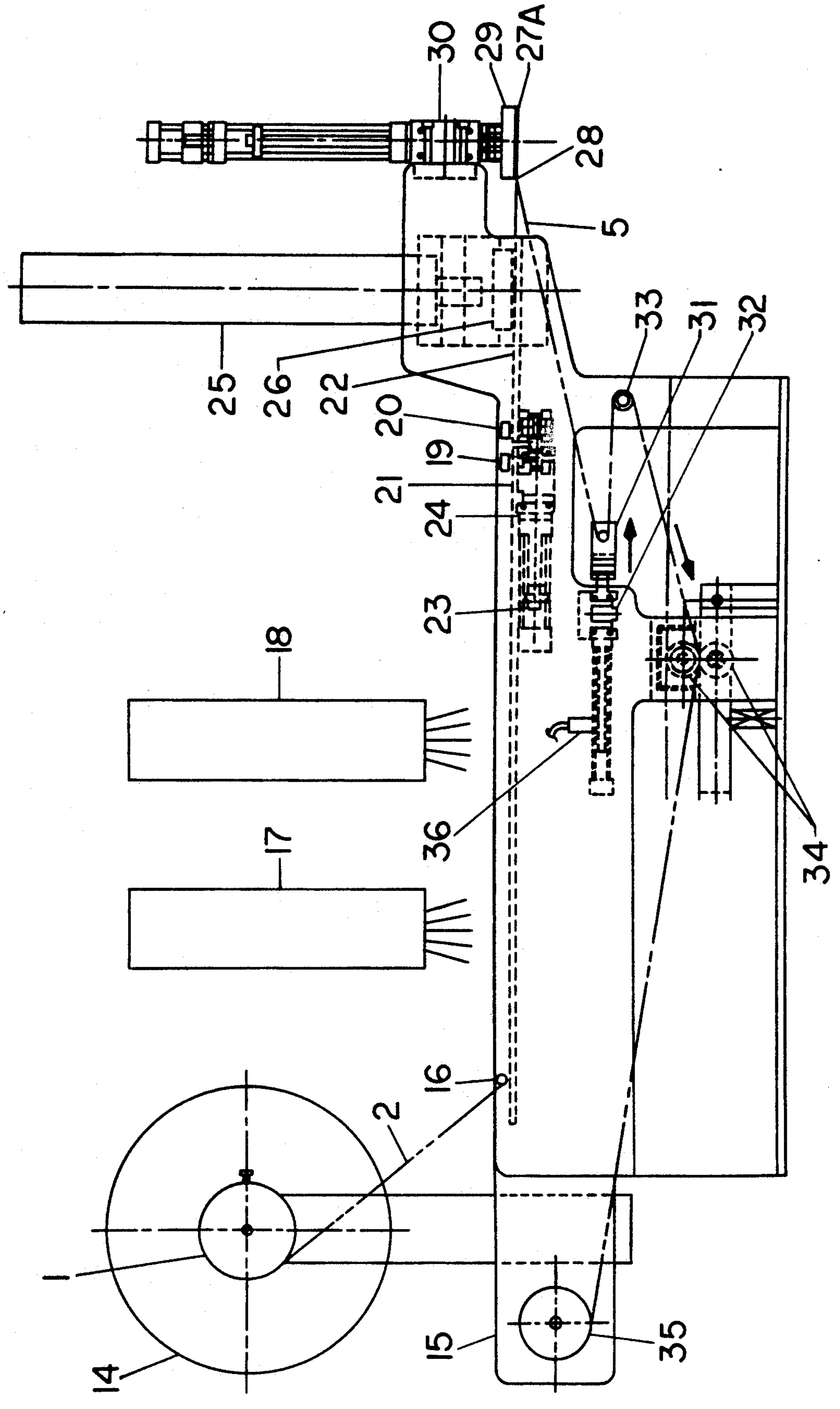
FIG. 5 is a schematic illustration of the apparatus during activation of the take-up rolls.

With reference to FIGS. 4 and 5, upon retraction of stripper plate 22 and the resulting longitudinally backwards motion of tension roll 31, a guide rod 31A which is rigidly attached to tension roll 31 is drawn longitudinally backwards until it makes contact with a proximity switch 36 which is mounted on tensioning means 32. The take-up rolls are stationary and not acting upon the carrier strip 5 during the backwards movement of the stripper plate 22. When contact is made, proximity switch 36 activates the drive roll motor (not shown) thereby actuating drive rolls 34 such that carrier strip 5 is drawn through the drive rolls and subsequently coiled on separately driven take-up reel 35. With feedstock 2, including carrier strip 5, rigidly clamped by fixed escapement bar 19, the movement imparted to the carrier strip by drive rolls 34 causes tension roll 31 and guide rod 31A attached thereto to move longitudinally forward. The guide rod 31A loses contact with the proximity switch 36 when tension roll 31 returns to its equilibrium position, thereby deactivating the drive-roll motor and causing the motion of the drive rolls 34 to cease. Cessation of movement of carrier strip 5 halts the forward motion of tension roll 31 in a position that maintains the desired degree of tension in carrier strip 5.

Referring again to FIG. 3, feedstock 2 is next transported longitudinally forward a precise distance by unclamping fixed escapement bar 19, causing movable escapement bar 20 to clamp the feedstock 2 rigidly to stripper plate 22, and causing stripper plate 22 to move a precise distance longitudinally forward such that the severed pressure-sensitive component 27A containing a first and second pattern portion is precisely located with respect to attachment head 29 of transport means 30, a preceding patterned section of feedstock 2 containing a first pattern portion and a coincident second pattern portion is precisely located with respect to circumferential severing member 26, a preceding pattern consisting of a first pattern portion only is precisely located with respect to second pattern imparting means 18, and an unpatterned section of feedstock 2 is precisely located with respect to first pattern imparting means 17. The forward motion of stripper plate 22 acting upon carrier strip 5 causes tension roll 31 to move longitudinally forward such that a constant degree of tension is maintained in carrier strip 5.

With feedstock 2 positioned as heretofore described, fixed escapement bar 19 is clamped to hold feedstock 2 tightly in position, movable escapement bar 20 is unclamped, and first pattern imparting means 17, second pattern imparting means 18, severing means 25, and transport means 30 are simultaneously activated such that first pattern imparting means 17 imparts a first pattern portion to an unpatterned section of the non-adherent surface of feedstock 2, second pattern imparting means 18 imparts a second pattern portion coincident with a previously imparted first pattern portion, severing means 25 circumferentially severs a component containing a previously imparted pattern consisting of a first pattern portion and coincident second pattern portion completely from feedstock 2 without severing carrier strip 5, and transport means 30 is caused to be rigidly attached to a previously severed pressure-sensitive composite component.

Upon completion of the aforesaid simultaneous activities, stripper plate 22 is retracted longitudinally backwards with respect to transport means 30 and carrier strip 5 is separated from the severed pressure-sensitive composite component 27A, which remains rigidly attached to transport means 30, and the heretofore described cycle is repeated.

The movement of stripper plate 22 is controlled by slide assembly 24 which may be any one of a number of commercially available slide mechanisms. Slide assembly 24 may be actuated by means of a pneumatic or hydraulic cylinder, a servomechanism, a cam, or any other means capable of imparting the desired motion and accuracy of movement. The longitudinally forward distance traversed by stripper plate 22 is precisely controlled by the position of clamp collars 23 such that the aforesaid first pattern portion becomes precisely aligned with second pattern imparting means 18, a previously imparted two-portion pattern is precisely located with respect to severing means 25, and a previously severed composite component is precisely located with respect to transport means 30.

Pattern imparting means 17 and 18 may be of a type that apply pigmented or unpigmented substances to a surface, of a type that deforms or severs a surface, or of a type that etches a surface, or of any other type capable of imparting the desired pattern.

Figure 6:
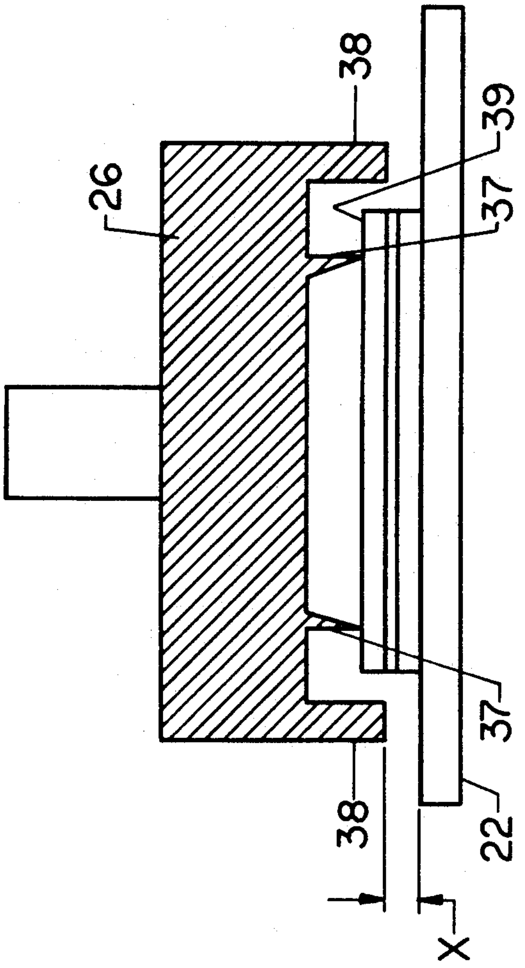
FIG. 6 is a schematic illustration of the circumferential severing member.
Figure 7:
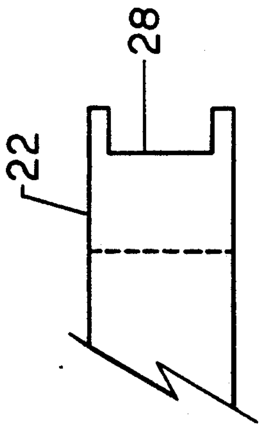
FIG. 7 is an illustration of a top view of the distal edge of the stripper plate and the machined slot therein.

Severing feedstock 2 such that the pressure-sensitive composite component is completely severed therefrom without severing carrier strip 5 is preferably achieved by means of moving circumferential severing member 26 a predetermined distance into the feedstock. With reference to FIG. 6, circumferential severing member 26 preferably consists of a severing blade 37 configured such that the cutting edge coincides with the circumference of the component being severed and two precisely machined protrusions 38 spaced apart a distance greater than the width of the feedstock to be severed. The length of protrusions 38 is greater than the length of severing blade 37 by an amount which assures that at the point at which severing blade 37 first contacts the uppermost surface of the feedstock 39, the distance "x" between the bottommost surface of the protrusions and the uppermost surface of the stripper plate 22 upon which feedstock 2 rests is essentially equal to the depth of the cut required to completely sever the component from the continuous length of pressure-sensitive composite material without severing the carrier strip 5. Severing blade 37 is moved vertically downward until its downward movement is stopped by contact of protrusions 38 with the uppermost surface of stripper plate 22.

The reciprocating vertical motion of circumferential severing member 26 may be imparted by means of a pneumatic or hydraulic cylinder, a servomechanism, a cam, or any other mechanism capable of imparting the desired motion to severing member 26. Although the severing process described herein has been limited to a vertical reciprocating motion and mechanical protrusions of non-variable length to control the length of the cutting stroke, it will be obvious to those skilled in the art that similar results may be obtained using a rotary cutter means containing precisely machined protrusions or maintaining contact between the rotary cutter means and a precisely machined section on the stripper plate 22, using protrusions of variable length such as those attached to a precision micrometer screw mechanism, controlling the depth of the cut by positive stops in the severing means, or the use of a precision cam to control downward movement.

Transport means 30 may be of any type known to those skilled in the art and may be actuated by means of a pneumatic or hydraulic cylinder, a servomechanism, a cam, or any other means capable of imparting the desired motion and accuracy of movement. Attachment head 29 may be activated by the application of vacuum, magnetic force, electrostatic force, or any other means of attaching a component to a pickup device. Attachment means 29 must be capable of attaching to sufficient surface area of severed component 27A to maintain accurate control over severed component 27A until attachment on the desired surface. Attachment head 29 is preferably a vacuum pickup head with a plurality of vacuum holes suitably distributed upon its attachment surface. Although transport means 30 has been depicted as having a vertically reciprocating motion, it will be obvious to those skilled in the art that similar results can be achieved with rotary pickup devices and devices acting in a non-vertical direction. Use of the present method and apparatus enables the precise placement of severed component 27A upon a desired surface at a position within at most 0.005 inch from the desired location on the surface. Accuracies of better than 0.005 inch are thus attainable.

While for convenience, the above discussion and illustrations have made reference to specific pressure-sensitive composite material configurations, manufacturing steps, and sequence of operations, it will be apparent to those skilled in the art that one may practice the invention employing other materials, manufacturing steps, and sequences of operations. Also, if desired, the invention may be practiced for the manufacture of pressure-sensitive composite components having a lateral dimension equal to the width of the composite material from which the component is severed, for unpatterned components produced as a result of bypassing or eliminating the pattern imparting means, and may be utilized for placing labels into recesses on the surface to which the label is to be adhered.

Whereas, particular embodiments of the invention have been described herein for the purposes of illustration, it will be evident to those skilled in the art that numerous variations of details may be made without departing from the invention as set forth in the appended claims.

What is claimed is:

1. An apparatus for the manufacture of a pressure-sensitive component from a feedstock of a continuous length of sensitive composite material releasably adhered to a continuous length of carrier strip and placement thereof, comprising:

a. a stationary member;

b. a means for imparting a predetermined longitudinally forward movement in relation to said stationary member to said feedstock, said means for imparting said predetermined longitudinally forward movement to said feedstock comprising a stripper plate and a slide assembly attached to said stripper plate;

c. a severing means positioned such that said predetermined longitudinally forward movement of said feedstock is capable of positioning a predetermined component of the pressure-sensitive composite material at a defined position relative to said severing means;

d. a transport means positioned such that said predetermined longitudinally forward movement of said feedstock is capable of positioning a severed component of the pressure-sensitive composite material at a defined position relative to said transport means; and e. a means for imparting a longitudinal backward motion to said stripper plate relative to said carrier to draw said carrier strip over a distal edge of said stripper plate; and f. a means for maintaining a substantially constant tension on the carrier strip, said constant tension means comprising a tension roll and tensioning means for controlling longitudinal position of said tension roll in relation to said stationary member, said tension roll being operatively attached to said tensioning means, said tension means causing said tension roll to move longitudinally backward when said stripper plate is moved longitudinally backward.

2. The apparatus according to claim 1 wherein said slide assembly comprises an actuating shaft and a plurality of clamp collars disposed so as to control said predetermined movement of said feedstock, said stripper plate operatively attached to said actuating shaft.

3. The apparatus according to claim 1 further comprising a means for releasably clamping said feedstock to said stripper plate.

4. The apparatus according to claim 1 further comprising a means for transporting said carrier strip from which said severed component has been separated to a take-up reel.

5. The apparatus according to claim 4 wherein said means for transporting carrier strip from which said severed component has been separated comprises take-up rolls.

6. The apparatus according to claim 4 further comprising a proximity switch attached to said tensioning means that activates said means for transporting said carrier strip from which said severed component has been separated to a take-up reel upon said tension roll reaching a predetermined longitudinal position, said proximity switch further deactivating said means for transporting said carrier strip from which said severed component has been separated to a take-up reel upon said tension roll reaching an equilibrium position.

7. The apparatus according to claim 1 wherein said severing means and said transport means are relatively positioned such that movement of said stripper plate a predetermined distance longitudinally forward simultaneously positions a predetermined component of the pressure-sensitive composite material at a defined location in relation to said severing means and positions a previously severed component of the pressure-sensitive composite material at a defined position in relation to said transport means.

8. An apparatus according to claim 1 further comprising a means for preventing lateral movement of said carrier strip.

9. An apparatus according to claim 8 wherein the means for preventing lateral movement of the carrier strip comprises a machined slot in a distal edge of said stripper plate.

10. The apparatus according to claim 1 further comprising at least one pattern imparting means.

11. The apparatus according to claim 10 wherein said pattern imparting means, said severing means and said transport means are relatively positioned such that movement of said stripper plate a predetermined distance longitudinally forward simultaneously positions a component of the pressure-sensitive composite material upon which a pattern has been previously imparted at a defined location in relation to said severing means and positions a previously severed component of the pressure-sensitive composite material at a defined position in relation to said transport means.

12. The apparatus according to claim 11 wherein said transport means is capable of attaching said severed component upon a desired surface at a location no greater than 0.005 inch from a predetermined location on the surface.

13. An apparatus for the manufacture of a pressure-sensitive component from a feedstock of a continuous length of sensitive composite material releasably adhered to a continuous length of carrier strip and placement thereof, comprising:

a. a stationary member;

b. a means for imparting a predetermined longitudinally forward movement in relation to said stationary member to said feedstock, said means for imparting said predetermined longitudinally forward movement to said feedstock comprising a stripper plate and a slide assembly attached to said stripper plate;

c. a severing means positioned such that said predetermined longitudinally forward movement of said feedstock is capable of positioning a predetermined component of the pressure-sensitive composite material at a defined position relative to said severing means;

d. a transport means positioned such that said predetermined longitudinally forward movement of said feedstock is capable of positioning a severed component of the pressure-sensitive composite material at a defined position relative to said transport means, and e. a means for releasably clamping said feedstock to said stationary member.

14. The apparatus according to claim 13 further comprising a means for imparting a longitudinal backward motion to said stripper plate relative to said carrier to draw said carrier strip over a distal edge of said stripper plate.

* * * * *